H. N. MOTSINGER.
PROPORTIONING DEVICE ESPECIALLY DESIGNED FOR CARBURETERS.
APPLICATION FILED JAN. 10, 1913. RENEWED APR. 21, 1915.

1,140,525.

Patented May 25, 1915.

Witnesses:
Frank A. Fahle
May Layden

Inventor
Homer N. Motsinger,
By Arthur M. O'Good
Attorney

UNITED STATES PATENT OFFICE.

HOMER N. MOTSINGER, OF LA FAYETTE, INDIANA.

PROPORTIONING DEVICE ESPECIALLY DESIGNED FOR CARBURETERS.

1,140,525.

Specification of Letters Patent. Patented May 25, 1915.

Application filed January 10, 1913, Serial No. 741,185. Renewed April 21, 1915. Serial No. 22,944.

*To all whom it may concern:*

Be it known that I, HOMER N. MOTSINGER, a citizen of the United States, residing at La Fayette, in the county of Tippecanoe and State of Indiana, have invented a new and useful Proportioning Device Especially Designed for Carbureters, of which the following is a specification.

It has long been well known that, under any particular atmospheric conditions a particular proportioning of air and a fuel gas, resulting from the evaporation or nebulization of a liquid hydrocarbon, will produce a better explosive or combustible mixture than some other proportioning, and it has also been recognized that the desirable proportioning, for any particular set of conditions, should remain the same irrespective of the volume of mixture used in any unit of time. It has also been recognized that varying weather conditions require variations in the amount of fuel per unit of volume of air.

The object of my invention is to produce an apparatus by means of which two flowing materials may be intermingled in exact and uniform proportions throughout the range of the apparatus and in which the proportion may be varied without interfering with the accuracy of proportionment throughout the range of the apparatus.

The accompanying drawings illustrate my invention as embodied in a carbureter for internal combustion engines but it will be recognized that this single application is only one of many to which my invention may be made.

In the drawings, 10 indicates the main body of a carbureter provided with an air inlet orifice 11, a fuel inlet orifice 12, and an outlet passage 13. Arranged in the inlet orifice 11 is a throttling valve 14 which is preferably of such type as to be moved toward an open direction by the suction applied to the outlet passage 13. Valve 14 is provided with a stem 15 arranged to engage the free end of a lever 16 which, in a portion of its length, is provided with an upwardly projected longitudinal knife-edge 17, upon which rests a knife-edge of a finger 18 which lies at right angles to lever 16. Finger 18 is carried by a rod 19 mounted in suitable brackets 20 and is normally urged in one direction by a spring 21, the rod 19 being moved in the opposite direction by any suitable connections 22 preferably extended to a point of convenient access as, for instance, the steering wheel of a motor car. Finger 18 is threaded on rod 19, as indicated in dotted lines in Fig. 1, so that the finger may be accurately adjusted longitudinally on the rod.

Figure 1:
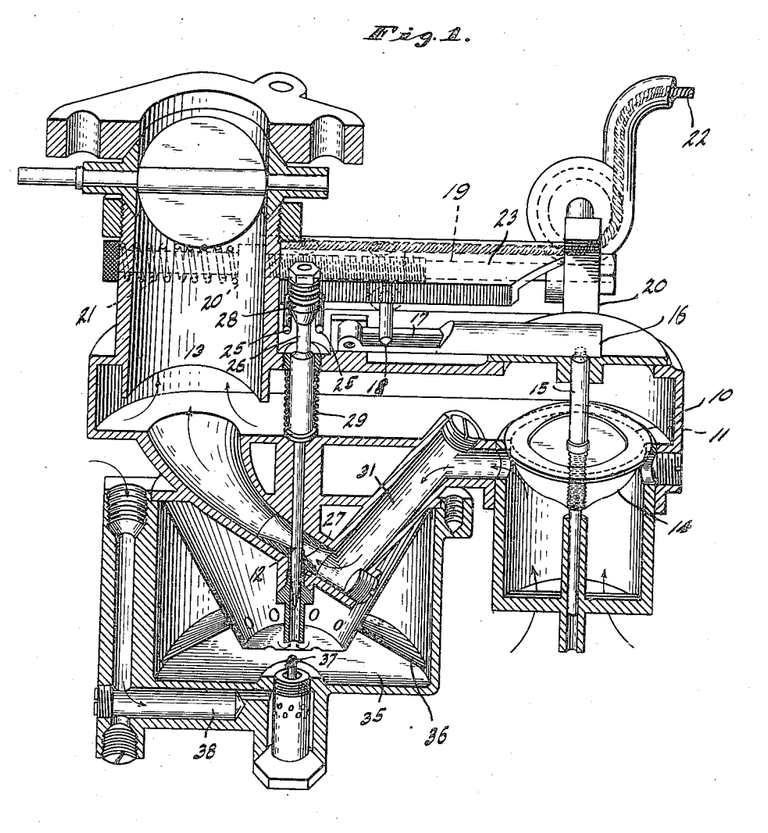
Figure 1 is a sectional perspective of a carbureter embodying my invention.
Figure 2:
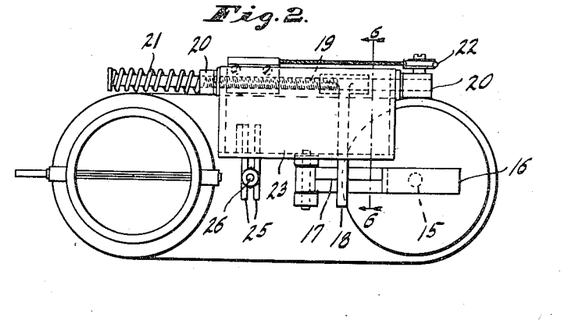
Fig. 2 a plan on a smaller scale.

Pivoted upon rod 19 between brackets 20 is a plate 23 which lies closely upon finger 18 but does not interfere with its lateral adjustment and this plate 23 carries a pair of fingers 25, 25 which straddle the stem 26 of a fuel valve 27 beneath the head 28 upon the stem 26. The fuel valve 27 is urged toward closing position in the fuel inlet orifice 12 by a spring 29 and head 28 may be adjusted so that the valve 27 will always be closed when valve 14 is closed and lever 16 is in its position in which edge 17 is parallel with the line of adjustment of finger 18. Passage 31 leads from a point in front of valve 14, past nozzle (or orifice) 12, and into alinement with passage 13, so that the mixture issuing from passage 31 will intermingle with the air admitted through orifice 11 before passing through the outlet passage 13. Fuel is supplied to orifice 12 from a reservoir 35 in which the level of fuel is controlled by a float 36 acting to open a self-closing valve 37 arranged in the supply passage 38.

The exact shape desirable for the two valves 14 and 27 will be dependent upon the shape of the orifices with which the valves are to coöperate but in any case each valve must be especially and carefully contoured with relation to the orifice with which it is to coöperate in such manner that equal lifts of the valve with relation to the orifice will result substantially in equal increments to the effective orifice area, wholly irrespective of the particular point in the total travel of the valve where such lift is made and irrespective of the amount of the unit lift so that if the total desired lift of the valve be divided into any given number of steps, then the total lift of the valve may be increased or diminished without changing the simple arithmetically-progressive increments to the effective orifice area.

As a circular orifice is the one most readily commercially formed, I shall show in detail the manner of determining the proper shape of a body of revolution which will coöperate with said orifice to produce the result above defined. In the determination of this matter there are a number of factors that will influence the quantity of fuel which will be delivered in any given unit of time through the orifice:—(a) The difference in pressure between the two sides of the orifice. (b) The area of the opening of the orifice. (c) The amount of resistance offered to the passage of the flowing material along the surfaces of the passageways, and by the eddy currents. (d) The amount of contraction in the stream caused by the character of the channels leading to and away from the orifice.

In the case of a carbureter it is not necessary to consider the first variable above mentioned, because the suction can vary through a considerable range without materially affecting the character of the mixture, provided the minimum vacuum maintained is sufficiently high, compared to the suction head which is necessary to start the gasolene flow. The quantity of air and of fuel delivered will then be proportional to the square root of the suction head. A change in the suction will, therefore, change the rate of delivering the mixture but will not materially change the proportion of fuel to air. This is readily determined from the equation:

$$W = .9644 A \sqrt{\frac{2g}{R}} \times \sqrt{P_v \frac{P_a - P_v}{T_a}},$$

where $W$=weight of air delivered, $A$=area of the orifice, $R$=the constant of air from the equation $PV=RT$, $P_a$=atmospheric pressure, $P_v$=pressure in carbureter body, $T_a$=absolute temperature of the atmosphere.

In the above equation everything is a constant except $$\sqrt{P_v(P_a - P_v)}.$$

Here $(P_a - P_v)$ is the suction head, and as $P_v$ is so nearly equal to $P_a$, the suction head $(P_a - P_v)$ may be considered as determining the value of the radical, and the weight of the air delivered varies in almost exact proportion to the square root of the suction head. Similarly if a liquid is the material being discharged through an orifice, the quantity will be determined by the equation $$Q = CA\sqrt{2gh_c}$$

where $C$=the coefficient of discharge, and $h_c = (P_a - P_v)$ expressed in feet of pressure head. In this equation all is constant except $\sqrt{h_c}$.

In a carbureter the effective head causing a delivery of fuel is less than the suction head by the small amount that the delivery tube for fuel extends above the fuel level in the float chamber. Compared to the total suction, this slight difference is negligible, and the quantity of fuel delivered may be considered as varying as $\sqrt{h_c}$. In this special design, however, the suction head remains nearly constant from no load at low speed to full load at maximum speed, thus reducing errors due to the slight elevation of the fuel nozzle, to an entirely negligible quantity.

The exact effect produced by the items (c) and (d) above mentioned cannot readily be determined mathematically but can be determined experimentally in a manner which I shall hereafter point out.

Figure 5:
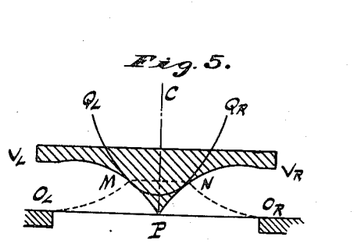
Fig. 5 a diagram used in the development of the formula for determining the shape of the throttling valve for any orifice diameter.
Figure 6:
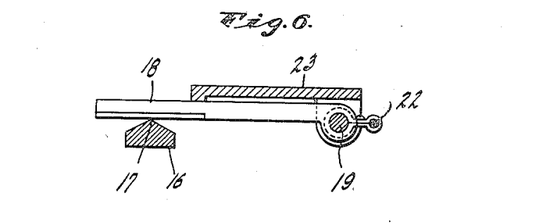
Fig. 6 a section on line 6—6 of Fig. 2.

The primary problem presented is a determination of the exact shape necessary for the valve as compared with its orifice and this can be determined mathematically. Supposing first a circular orifice to be throttled by a needle valve which is to be a body of revolution about an axis passing through the center of the orifice and coaxial therewith. Referring now to Fig. 5, $O_L$ and $O_R$ indicates a circular orifice; $V_L P V_R$ indicates a valve which is to be a solid of revolution about the axis CP; MN indicates any circle parallel to the plane of the orifice and in the surface of the valve; $O_L M$ indicates the section of the surface of minimum area which will close the orifice between the circles $O_L O_R$ and MN. If now it be assumed that the circle MN moves from P to $V_L R_R$ in such a way that it is always parallel to the plane of the orifice, and so that the minimum surface closing the opening between MN and $O_L O_R$ is a constant and equal to the area of the orifice, then $V_L MPNV_R$ will be the surface formed by MN in this movement. Let $Q_L MNQ_R$ equal any other valve tangent to the surface $V_L P V_R$ at the circle MN but not cutting $V_L V_R$ at any point. Then the valve $Q_L MNQ_R$ will define the area, as it contains the circle MN, but at all other points lies beyond the surface $V_L MPNV_R$.

Figure 3:
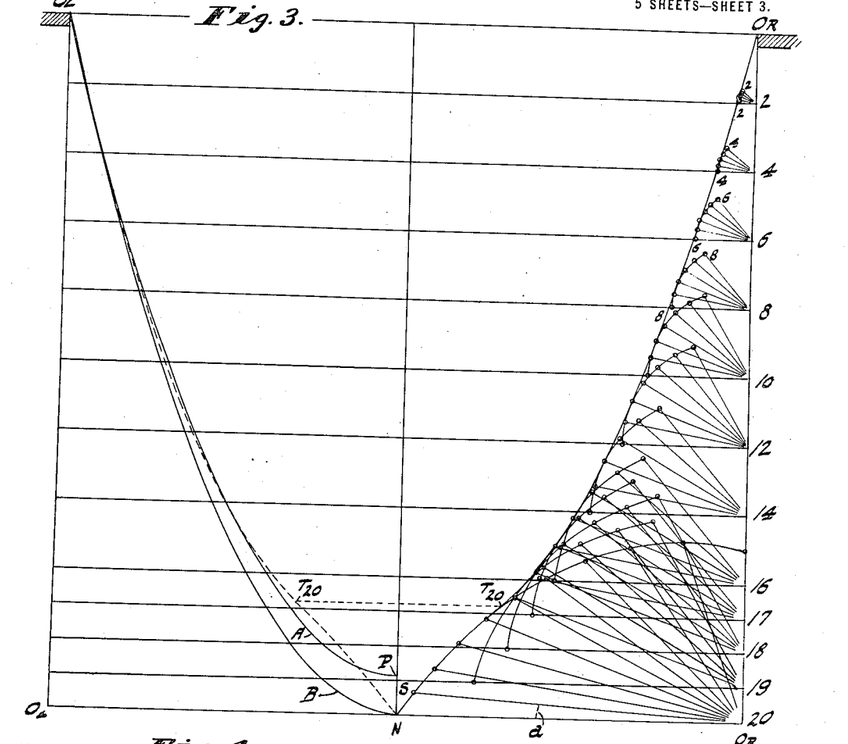
Fig. 3 a diagrammatic development of a properly formed throttling valve by means of which equal effective area increments of flow orifice may be obtained by equal lifts of the throttling valve, said figure also showing some approximations thereto.

Referring now to Fig. 3, let $O_L O_R$ be a circular orifice and assume that the valve is fixed in position and that the orifice take the successive positions 2, 4, 6, etc., such positions being equal advancements of the orifice relative to the valve.

Let $A$=the area of the orifice; $L$=the entire lift of the valve, $L_n$=the lift of the valve at any point $n$, and $A_2 = A\frac{L_2}{L}$.

Referring again to Fig. 5. It has been found, by the calculus of variations, that the minimum closing surface to close an annular opening between two parallel circles not in the same plane, is formed by revolving catenary $NO_R$ around CP as an axis. It is not deemed necessary to develop the mathematical computations for this proposition because they are known and exceedingly complex and also because, in a case of comparatively small valves, such as would be used in carbureters, the area of the catenoid is so very nearly equal to that of the surface of the frustum of the cone between the two circles that the latter area has been used in the subsequent computations. Such procedure produces sufficient accuracy for ordinary purposes and is proper in view of the fact that the slight errors due thereto are modified by the variables $(c)$ and $(d)$ already referred to and which must be worked out, for extreme accuracy, by some experimental process such as I shall hereafter describe.

Referring again to Fig. 3, let S=a point on any circle of the valve parallel to the plane of the orifice, $h=OS=$the slant height of the opening between orifice and valve, $r=$the radius of the orifice, $a=$the angle which (OS) makes with (NO), $r_n=$ the radius of the mid circumference of the frustum of the cone formed by revolving (OS) about (MN).

Then $\pi r^2 = 2\pi r_n h$, $2r_n = 2r - h \cos a$, $r^2 = 2rh - h^2 \cos a$.

Let $h = cr = $ a constant multiplied by $r$.

Then $\cos a = \frac{2c-1}{c^2}$.

Substituting a series of values for $c$ above, we get the following table:

| $c$ | Cos. $a$. | $a$. | $h$. |
|---|---|---|---|
| .95 | .998 | 4°–0′ | 5.70 |
| .90 | .988 | 8°–45′ | 5.4 |
| .85 | .966 | 15°–0′ | 5.1 |
| .80 | .938 | 20°–15′ | 4.8 |
| .75 | .889 | 27°–15′ | 4.5 |
| .70 | .816 | 35°–15′ | 4.2 |
| .65 | .710 | 44°–45′ | 3.9 |
| .60 | .556 | 56°–15′ | 3.6 |
| .55 | .3305 | 70°–45′ | 3.3 |

Fig. 3 is plotted from this table.

Referring now to Fig. 3, let the total lift $O_R O_{20}$ be divided into twenty equal steps. The area of a 12 inch circle is 113.100+ square inches. Call this (A). At position 2 (Fig. 3) the area of the opening must equal $\frac{2A}{20}$, and this is equal to 11.31 square inches. At position 4, the area will be equal to $\frac{4A}{20}$, at the position 5, $\frac{5A}{20}$, etc.

Starting at position 2, and assuming a series of values for $a$, take different trial values for $h$ until $$\pi(d - h \cos a)h = 11.310.$$

When a proper $h$ has been found for each of a series of values of $a$, the curve (2—2), shown in Fig. 3 of the drawings, can be drawn. Passing to position 4 and following the same procedure, the curve (4—4) can be drawn in the same way and similar curves for as many other positions as may be desired. The figures for these several curves, assuming the orifice diameter $O_L O_R$ to be 12 inches, are contained in the following table:

| Position. | A. | $a$. | $h$. | Cos. $a$. | $h$ cos. $a$. | Mid. diam. | Mid. circum. | Computed A. |
|---|---|---|---|---|---|---|---|---|
| 2 | 11.31 | 0 | .308 | 1 | .308 | 11.692 | 36.7 | 11.31 |
|  |  | 10 | .308 | .985 | .302 | 11.697 | 36.7 | 11.30 |
|  |  | 20 | .307 | .94 | .2885 | 11.71 | 36.8 | 11.30 |
|  |  | 30 | .3065 | .866 | .265 | 11.735 | 36.86 | 11.30 |
|  |  | 40 | .306 | .766 | .235 | 11.765 | 36.961 | 11.30 |
| 4 | 22.62 | 0 | .635 | 1 | .635 | 11.635 | 35.702 | 22.65 |
|  |  | 10 | .634 | .985 | .624 | 11.376 | 35.74 | 22.68 |
|  |  | 20 | .631 | .94 | .594 | 11.406 | 35.814 | 22.61 |
|  |  | 30 | .628 | .866 | .544 | 11.456 | 35.990 | 22.6 |
|  |  | 40 | .626 | .766 | .480 | 11.52 | 36.190 | 22.62 |
| 6 | 33.93 | 0 | .980 | 1 | .980 | 11.02 | 34.621 | 33.92 |
|  |  | 10 | .978 | .985 | .972 | 11.028 | 34.646 | 33.91 |
|  |  | 20 | .973 | .944 | .9125 | 11.0875 | 34.831 | 33.91 |
|  |  | 30 | .967 | .866 | .836 | 11.164 | 35.079 | 33.90 |
|  |  | 40 | .958 | .766 | .734 | 11.266 | 35.393 | 33.93 |
|  |  | 50 | .948 | .643 | .610 | 11.39 | 35.783 | 33.93 |
| 8 | 45.28 | 0 | 1.35 | 1 | 1.35 | 10.65 | 33.458 | 45.3 |
|  |  | 10 | 1.346 | .985 | 1.325 | 10.685 | 33.54 | 45.20 |
|  |  | 20 | 1.338 | .94 | 1.257 | 10.743 | 33.753 | 45.25 |
|  |  | 30 | 1.321 | .866 | 1.144 | 10.856 | 34.105 | 45.21 |
|  |  | 40 | 1.29 | .766 | 1.00 | 11.000 | 34.558 | 45.22 |
|  |  | 50 | 1.27 | .643 | .818 | 11.182 | 35.129 | 45.25 |
| 10 | 56.55 | 0 | 1.758 | 1 | 1.758 | 10.242 | 32.176 | 56.54 |
|  |  | 10 | 1.752 | .985 | 1.721 | 10.279 | 32.29 | 56.6 |
|  |  | 20 | 1.7325 | .94 | 1.63 | 10.37 | 32.578 | 56.5 |
|  |  | 30 | 1.710 | .866 | 1.47 | 10.53 | 33.08 | 56.6 |
|  |  | 40 | 1.68 | .766 | 1.304 | 10.696 | 33.603 | 56.55 |
|  |  | 60 | 1.605 | .5 | .8025 | 11.1975 | 35.178 | 56.55 |
| 12 | 67.86 | 0 | 2.20 | 1 | 2.20 | 9.80 | 30.7876 | 67.80 |
|  |  | 10 | 2.19 | .985 | 2.155 | 9.845 | 30.93 | 67.8 |
|  |  | 20 | 2.165 | .94 | 2.035 | 9.965 | 31.300 | 67.8 |
|  |  | 30 | 2.12 | .866 | 1.835 | 10.165 | 31.937 | 67.78 |
|  |  | 40 | 2.08 | .766 | 1.614 | 10.380 | 32.608 | 67.8 |
|  |  | 60 | 1.96 | .50 | .98 | 11.02 | 34.620 | 67.85 |
| 14 | 79.17 | 0 | 2.72 | 1 | 2.72 | 9.28 | 29.177 | 79.18 |
|  |  | 10 | 2.70 | .985 | 2.66 | 9.34 | 29.34 | 79.20 |
|  |  | 20 | 2.65 | .94 | 2.49 | 9.51 | 29.88 | 79.10 |
|  |  | 30 | 2.585 | .866 | 2.238 | 9.762 | 30.668 | 79.12 |
|  |  | 40 | 2.50 | .766 | 1.914 | 10.086 | 31.686 | 79.20 |
|  |  | 50 | 2.42 | .643 | 1.555 | 10.445 | 32.814 | 79.20 |
|  |  | 70 | 2.24 | .342 | .766 | 11.234 | 35.292 | 79.15 |
| 16 | 90.48 | 0 | 3.32 | 1 | 3.32 | 8.67 | 27.24 | 90.5 |
|  |  | 10 | 3.28 | .985 | 3.22 | 8.78 | 27.58 | 90.4 |
|  |  | 20 | 3.20 | .94 | 3.01 | 8.99 | 28.24 | 90.4 |
|  |  | 30 | 3.09 | .866 | 2.67 | 9.33 | 29.31 | 90.6 |
|  |  | 40 | 2.96 | .766 | 2.27 | 9.72 | 30.56 | 90.50 |
|  |  | 50 | 2.83 | .643 | 1.810 | 10.19 | 32.01 | 90.6 |
| 17 | 96.135 | 0 | 3.68 | 1 | 3.68 | 8.32 | 26.14 | 96.2 |
|  |  | 10 | 3.64 | .985 | 3.580 | 8.42 | 26.45 | 96.5 |
|  |  | 20 | 3.52 | .94 | 3.31 | 8.69 | 27.30 | 96.15 |
|  |  | 30 | 3.39 | .866 | 2.97 | 9.03 | 28.37 | 96.18 |
|  |  | 40 | 3.22 | .766 | 2.48 | 9.52 | 29.90 | 96.20 |
|  |  | 50 | 3.085 | .643 | 1.97 | 10.03 | 31.15 | 96.10 |
|  |  | 60 | 2.91 | .50 | 1.455 | 10.545 | 33.13 | 96.2 |
| 18 | 101.79 | 0 | 4.10 | 1 | 4.10 | 7.90 | 24.81 | 101.5 |
|  |  | 20 | 3.89 | .94 | 3.66 | 8.34 | 26.2 | 101.7 |
|  |  | 30 | 3.68 | .866 | 3.185 | 8.815 | 27.69 | 101.8 |
|  |  | 40 | 3.45 | .766 | 2.63 | 9.37 | 29.44 | 101.6 |
|  |  | 50 | 3.26 | .643 | 2.08 | 9.92 | 31.17 | 101.5 |
|  |  | 60 | 3.12 | .500 | 1.60 | 10.40 | 32.70 | 101.8 |
| 19 | 107.445 | 0 | 4.66 | 1 | 4.66 | 7.34 | 23.09 | 107.45 |
|  |  | 20 | 4.26 | .94 | 3.95 | 8.05 | 25.29 | 107.6 |
|  |  | 30 | 4.00 | .866 | 3.46 | 8.54 | 26.829 | 107.4 |
|  |  | 40 | 3.73 | .766 | 2.83 | 9.17 | 28.80 | 107.5 |
|  |  | 50 | 3.51 | .643 | 2.25 | 9.75 | 30.63 | 107.5 |
|  |  | 60 | 3.31 | .50 | 1.65 | 10.35 | 32.52 | 107.5 |

When the several curves, above described, have been drawn, it will be readily apparent that the line $O_R T_{20} N$ (Fig. 3) drawn tangent to these several curves will be the line of generation for the production of a solid of revolution which will be theoretically of the proper form to give equal increments of effective orifice area for equal vertical lifts when the total lift of the valve is equal to the orifice diameter. Following the same theory, the full line $O_R N_2$ in Fig. 4 will be the generating line for the valve when the lift of the valve is equal to one-half of the orifice diameter.

Referring again to Fig. 3, it will be seen that at the line $T_{20}$, which indicates the plane where the curvature of the generating line changes, the shape of the valve below this line does not alter the effective size of the orifice and therefore the nose or tip of the valve may be given any shape so long as it lies above the curve $T_{20} N$ but it is advisable to follow close to the line $T_{20} N$ in order to reduce the possibility of the production of eddy currents in the issuing stream of gas.

For many practical purposes, where extreme accuracy is not necessary, the parabola $O_L BN$ might be used as the generating line for the valve, for an examination of Fig. 3 of the drawings shows that for an orifice of the size shown there will be a gradual increase of error as the valve is lifted from its closing position, the later opening steps failing to add a complete increment unit to the effective area. A closer approximation may be obtained by using the parabola $O_L AP$ which, as seen in Fig. 3, lies a little inside the true curve at about the middle of the length and lies a little outside of the true curve at the point of the valve. It will be readily understood, of course, that where the valve is small, the error is not so apparent but where such a valve is used, it should be remembered that the total outflow is small and that therefore where the relation between orifice diameter and valve lift remain the same, the error is as great in one size of valve as another, so that the true curve, as determined in the manner set forth above should be followed as closely as possible. It should also be noticed that where the lift of the valve is less than the orifice diameter, the difference between approximating parabolas and the true generating line is much more marked. This is clearly shown in Fig. 4, where the dotted lines show approximating parabolas.

Figure 4:
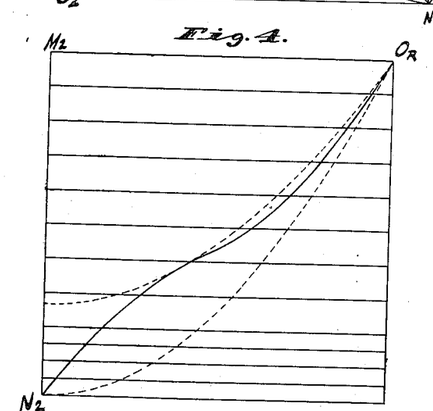
Fig. 4 a diagram showing the generating line for the proper form of a valve where the total lift of the valve is equal to half its diameter.
Figure 7:
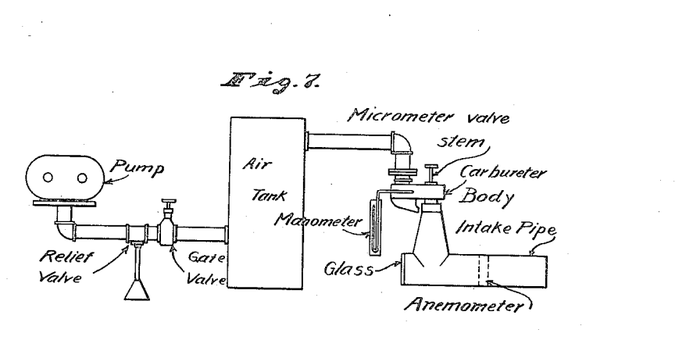
Fig. 7 a diagram of a test apparatus for experimentally calibrating the valves.

As I have already stated, the forms of valve shown in Figs. 3 and 4 and other valves determined by the table given above, are obtained by neglecting certain variables which are more readily determined experimentally than mathematically and where extreme accuracy is desired, should be obtained experimentally. For this purpose, I have found it advisable to provide an apparatus illustrated diagrammatically in Fig. 7 of the drawings. In this test apparatus, the air pump has a sufficient capacity to maintain a vacuum of 11 1/2 inches of water above the valve in the carbureter, with the auxiliary valve wide open. This vacuum is measured by means of a water manometer attached to the body of the carbureter just below the throttle, as indicated in Fig. 7. The carbureter body is soldered into an intake pipe in which an anemometer is placed so that all of the air passing through the valve orifice must also pass through the anemometer. The position of the test valve is measured by means of a micromometer valve stem which, in my test apparatus, had 40 threads to the inch. This stem is threaded through the body casting of the carbureter and capped by a disk graduated into twenty-five equal parts so that the exact position of the valve relative to the orifice may be accurately determined. The anemometer used should be, and was, provided with an accurate calibration curve giving exact velocity in feet per minute corresponding to each reading of the instrument. The volume of air passing through the valve will be exactly proportional to the velocity through the anemometer. If now the valve be set in a number of different positions and the air passing through each orifice in a given time be accurately determined when a constant vacuum is maintained in the carbureter, the lift-delivery curve should be a straight line. Any variation from a straight line will readily indicate the exact valve position which, by reason of some local disturbance, varies from the theoretically proper shape and by changing the shape of the valve at this point, thus altering the valve generating line, the exact valve form for the particular apparatus may be determined, it being always remembered that the desired valve form is one which will give substantially equal increments of effective orifice area for equal valve lifts no matter where, in the total valve movement, the particular valve lift is made.

In testing the fuel needle, the fuel is supplied to the carbureter from a tank balanced on delicate scales. With the fuel tank a little too heavy to balance, the pump is started and regulated to give the desired vacuum at the carbureter. The instant the tank comes to a balance and starts to rise, a stop watch is started and a known weight is removed from the weight pan and the time that elapses before the fuel tank balances again is recorded. The lift-delivery curve is then drawn for the fuel needle and the needle corrected in shape until it gives a straight delivery curve.

I have considered it advisable to enter into considerable detail as to the exact manner of determining the proper shape of the proportioning valves because, while I am aware that many designers of carbureters and other similar proportioning devices have recognized the desirability of obtaining uniformity of proportioning of mixtures throughout the range of appartaus, yet so far as I am aware, no such apparatus having the possibility of adjustment to vary the proportion has ever heretofore been produced because of a failure, on the part of prior designers to recognize the fact that ordinary forms of valves common in use for throttling purposes, are wholly incapable of adding uniform increments of effective orifice area for uniform movements away from the closing position throughout the range of movement of the valve.

Attention has already been directed to the primary air passage 31 which is always open. I believe that in practice the best results can be obtained with such an arrangement and when it is provided it is, of course, necessary to provide some arrangement by which the air volume through this passage will always receive its proportionate amount of fuel. In the form shown in the drawings all of the fuel is first delivered to the particular quantity of air passing through the primary air passage, to be subsequently mixed with the other air which is admitted by the movement of valve 14, but, no matter what the arrangement may be, the particular quantity of air passing through the primary passage, as compared with the quantity of air passing through the passage controlled by valve 14, should receive its exact quota of fuel. In order to accomplish this result, in the form of apparatus shown in Fig. 1, the upper end of valve stem 15 is vertically adjustable being threaded upon the main valve stem, so that the free end of lever 16 may, by an adjustment of the upper end of stem 15, be moved upwardly an amount which, compared with the total maximum lift of the lever (i. e., the total maximum lift of valve 14 from closed position to wide open) will be in the same ratio as exists between the total effective area of the primary air passage and the maximum effective area of the opening controlled by valve 14.

Figure 8:
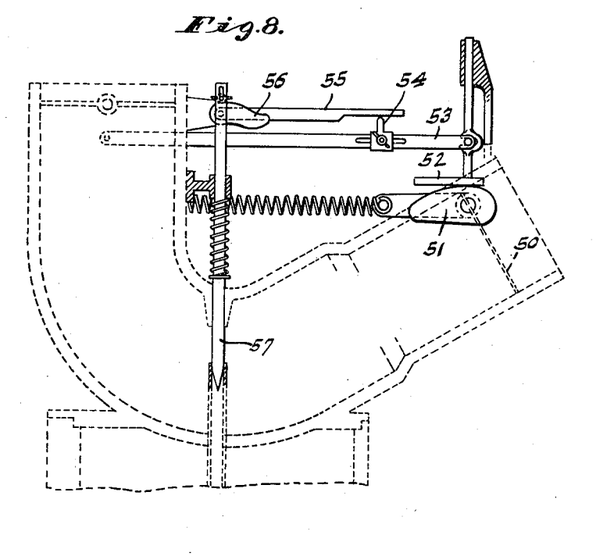
Figs. 8, 9 and 10 diagrams of various means for obtaining proper relative movements of the two valves.

It will be readily understood that many different forms of mechanisms may be provided to obtain the desired proportional movements of the two valves and that the structure shown in Fig. 1 is selected, not because it is the only structure, but because it is one used in the practical development of my invention. In Fig. 8 I show diagrammatically another construction for accomplishing the same purpose. In this construction a swinging air valve 50 is provided with a cam 51 operating upon a shoe 52 which engages a lever 53. Lever 53 carries a longitudinally adjustable finger 54 operating upon a lever 55 which carries a cam 56 operating upon the stem of valve 57. In order to determine the shapes of the cams used in this construction, the maximum movement of valve 50 should be divided into equal area increments and the same should be done for the maximum movement of valve 57 and when this has been done the exact configuration of the necessary cams may be determined according to the usual manner of laying out cams for the accomplishment of any particular and desired movement.

Figure 9:
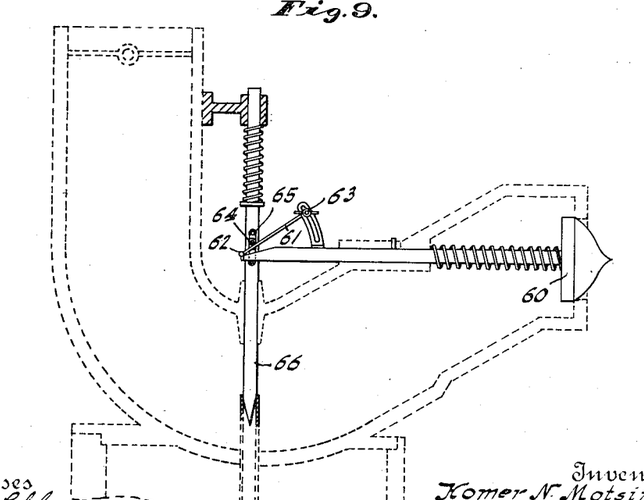

In the form shown in Fig. 9, the stem of valve 60 is provided with a cam plate 61 pivoted at 62 upon the stem of the valve and provided at its other end with a clamping nut 63 by means of which the angle of inclination of the cam 61 may be varied. The cam 61 operates directly upon a pin 64, conveniently adjustably held by clamp 65, upon the stem of valve 66. In this form also the valves must be so formed, as compared with the orifices controlled thereby, as to give equal area increments for equal lifts of the valve. It may be well here to state that the "lift" of the valve is intended here to mean a relative movement between the valve and the orifice controlled thereby.

Figure 10:
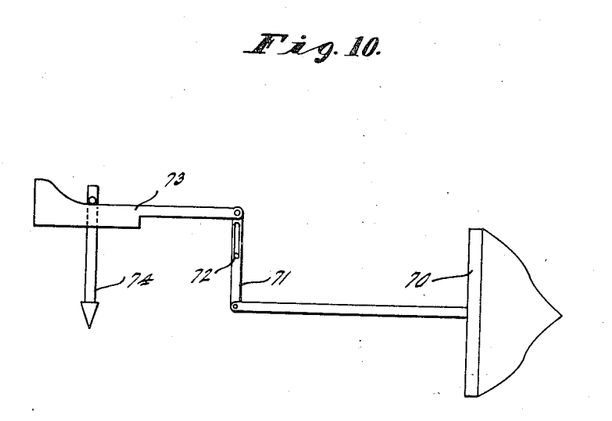
Figure 11:
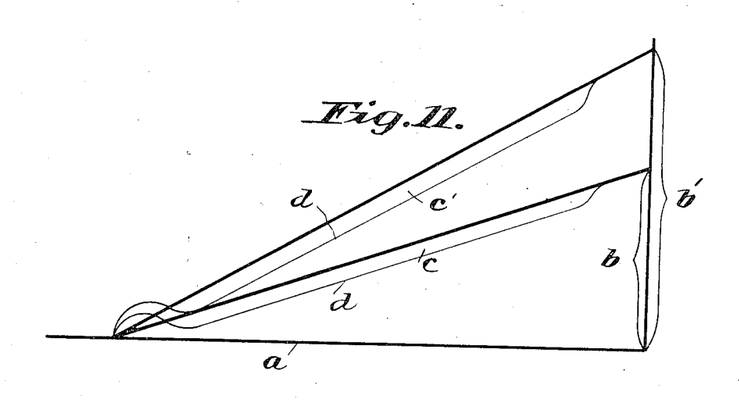
Fig. 11 a diagram illustrating the relationship between air and fuel inlet.

In Fig. 10 the valve 70 is connected to a lever 71 having a shiftable fulcrum 72 and lever 71 carries a cam plate 73 operating upon the stem of valve 74. Whatever form of valve actuating means is provided, it must be such, as compared with the throttling value of the valve that, when any particular total movement of the valve is settled upon, then a certain defined "lift" of the valve will always give a certain increment of effective area no matter what portion of the total stroke the particular lift may be.

I claim as my invention:

1. A carbureter comprising an air passage, an automatically-operating, inwardly-opening air valve for controlling the inlet area of the air passage, a fuel passage delivering into the air passage on the vacuum side of the air valve, a fuel valve for controlling the outlet area of the fuel passage, and intermediate connections between the air valve and the fuel valve whereby minute arithmetically-varying effective-delivery inlet areas of the air passage will be accompanied by corresponding minute arithmetically-varying effective-delivery outlet areas of the fuel passage, said intermediate connections comprising an adjustable member whereby the ratio between the movement of the air valve and the fuel valve may be varied.

2. A carbureter comprising an air passage, an automatically-operating, inwardly-opening valve for controlling the inlet area of the air passage, a fuel passage delivering into the air passage beyond the air valve, a fuel valve for controlling the outlet area of the fuel passage, and intermediate connections between the air valve and fuel valve whereby minute arithmetically-varying effective-delivery inlet areas of the air passage will be accompanied by corresponding minute arithmetically-varying effective-delivery outlet areas of the fuel passage, said intermediate connections comprising an adjustable member whereby the ratio between the movement of the air valve and the fuel valve may be variably adjusted, one of said valves comprising a paraboloid.

3. A carbureter comprising an air passage, an air valve for controlling the inlet area of the air passage, said valve being operable inwardly by suction, means normally moving said valve toward closing position, a fuel passage delivering into the air passage on the vacuum side of the air valve, a fuel valve for controlling the outlet area of the fuel passage, and intermediate connections between the air valve and the fuel valve whereby minute arithmetically varying inlet areas of the air passage will be accompanied by corresponding minute arithmetically varying outlet areas of the fuel passage, said intermediate connections comprising an adjustable member whereby the ratio between the movements of the air valve and the fuel valve may be varied.

4. A carbureter comprising an air passage, an automatic suction-controlled throttling valve associating with said passage and having a form such that equal minute successive lifts of the valve will add successive equal minute increments to the effective area of the air passage, a fuel passage, a throttling valve associating with said passage and having a form such that equal minute successive lifts of the valve will add successive equal minute increments to the effective area of the fuel passage, and means for simultaneously operating said valves, said operating means comprising an adjustable member by which the total lift of one valve relative to the other may be varied.

5. A carbureter comprising an air passage, an automatically-operating, inwardly-opening air valve for controlling the inlet area of the air passage, a fuel passage delivering into the air passage on the vacuum side of the air valve, a fuel valve of the coaxial-plug type for controlling the outlet area of the fuel passage, and intermediate connections between the air valve and the fuel valve whereby simple arithmetically-varying effective-delivery inlet areas of the air passage will be accompanied by corresponding simple arithmetically-varying effective-delivery outlet areas of the fuel passage, said intermediate connections comprising an adjustable member whereby the ratio between the movement of the air valve and the fuel valve may be varied.

6. A proportioning mixer comprising two flow passages, two throttling valves associated with said flow passages, one of said valves having a normal full stroke movement, intermediate adjustable connections between said two valves whereby movement of the full stroke valve will produce different desired proportionate movements of the other valve, and the said other valve being of the coaxial-plug type and having such form relative to the orifice which it controls that equal minute lifts of said valve, throughout its range of movement, will give substantially equal minute outlet increments.

7. A carbureter, comprising an air passage, an automatic suction-controlled valve controlling said air passage and having a normal maximum passage-controlling throw, a fuel passage, a controlling valve of the coaxial-plug type for the fuel passage and so formed, relative to the fuel passage that equal lifts of the valve will add equal increments to the effective area of the fuel passage, and adjustable connections between the air valve and fuel valve for varying the maximum throw of the fuel valve relative to the throw of the air valve.

8. A carbureter, comprising an air passage, an automatic suction-controlled valve controlling said air passage and having a normal maximum passage-controlling throw, a fuel passage, a controlling valve for the fuel passage and so formed, relative to the fuel passage that equal minute lifts of the valve will add equal minute increments to the effective area of the fuel passage, and adjustable connections between the air valve and fuel valve for varying the throw of the fuel valve relative to the throw of the air valve.

9. In a carbureter, an air passage, a suction-controlled valve controlling said air passage and having a normal maximum throw, said valve being of the coaxial-plug type, a fuel passage, a valve of the coaxial-plug type controlling said fuel passage and so formed relative to the fuel passage that equal lifts of the valve will add equal increments to the effective area of the fuel passage, a lever connected to the air valve and moved thereby, a lever connected to the fuel valve to move the same, and a movable finger arranged between the two levers to transmit proportionately the movement of the air valve to the fuel valve.

10. In a carbureter, an air passage, a suction-controlled valve controlling said air passage and having a normal maximum throw, a fuel passage, a valve of the coaxial-plug type controlling said fuel passage and so formed relative to the fuel passage that equal lifts of the valve will add equal increments to the effective area of the fuel passage, a lever connected to the air valve and moved thereby, a lever connected to the fuel valve to move the same, and a movable finger arranged between the two levers to transmit proportionately the movement of the air valve to the fuel valve.

11. In a carbureter, an air passage, a suction-controlled valve controlling said air passage and having a normal maximum throw, said valve being of the coaxial-plug type, a fuel passage, a valve controlling said fuel passage and so formed relative to the fuel passage that equal lifts of the valve will add equal increments to the effective area of the fuel passage, a lever connected to the air valve and moved thereby, a lever connected to the fuel valve to move the same, and a movable finger arranged between the two levers to transmit proportionately the movement of the air valve to the fuel valve.

12. In a carbureter, an air passage, a suction-controlled valve controlling said air passage and having a normal maximum throw, a fuel passage, a valve controlling said fuel passage and so formed relative to the fuel passage that equal lifts of the valve will add equal increments to the effective area of the fuel passage, a lever connected to the air valve and moved thereby, a lever connected to the fuel valve to move the same, and a movable finger arranged between the two levers to transmit proportionately the movement of the air valve to the fuel valve.

In witness whereof, I have hereunto set my hand at La Fayette, Indiana, this fourth day of January, A. D. one thousand nine hundred and thirteen.

HOMER N. MOTSINGER.

Witnesses:
  O. C. BERRY,
  B. L. ROGERS.